US012608258B2

(12) United States Patent
Halder et al.

(10) Patent No.: US 12,608,258 B2
(45) Date of Patent: Apr. 21, 2026

(54) METHOD AND SYSTEM OF DETERMINING ANOMALIES IN A TARGET SYSTEM USING A LARGE LANGUAGE MODEL

(71) Applicant: L&T TECHNOLOGY SERVICES LIMITED, Chennai (IN)

(72) Inventors: Kaushik Halder, Chennai (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 18/813,125

(22) Filed: Aug. 23, 2024

(65) Prior Publication Data

US 2025/0390368 A1 Dec. 25, 2025

(30) Foreign Application Priority Data

Jun. 21, 2024 (IN) ............................ 202441047819

(51) Int. Cl.
*G06F 11/00* (2006.01)
*G06F 11/07* (2006.01)
*G06F 40/40* (2020.01)

(52) U.S. Cl.
CPC ...... *G06F 11/0751* (2013.01); *G06F 11/0721* (2013.01); *G06F 40/40* (2020.01)

(58) Field of Classification Search
CPC ... G06F 11/0751; G06F 11/0721; G06F 40/40
USPC ........................................................ 714/1–57
See application file for complete search history.

(56) References Cited

U.S. PATENT DOCUMENTS

| | | | |
|---|---|---|---|
| 11,183,001 B2 | 11/2021 | Lowenthal et al. | |
| 2019/0163553 A1* | 5/2019 | Ramegowda ....... | G06F 16/3344 |
| 2025/0165330 A1* | 5/2025 | Venkatachalam ..... | G06F 11/079 |
| 2025/0245120 A1* | 7/2025 | Bao ......................... | G06F 40/20 |
| 2025/0310226 A1* | 10/2025 | Silverstein ............ | G06F 16/282 |
| 2025/0328784 A1* | 10/2025 | Caulfield .............. | G06F 40/216 |

FOREIGN PATENT DOCUMENTS

| | | | |
|---|---|---|---|
| JP | 6253627 | A | 5/1996 |
| KR | 1020100076352 | B1 | 10/2010 |
| WO | PCT/IB2021/054297 | A1 | 11/2021 |

OTHER PUBLICATIONS

New Atlas; Prototype EV powered by radio frequency transmission demonstrated; Oct. 15, 2014.

* cited by examiner

*Primary Examiner* — Sarai E Butler
(74) *Attorney, Agent, or Firm* — Kendal M. Sheets

(57) ABSTRACT

A method and system of determining anomalies in a target system using a large language model (LLM), is disclosed. A processor receives a user experience corresponding to the target system, and specification data of the target system from a user. A first set of parameters is determined based on the user experience and the specification data. A cause is determined corresponding to the at least one anomaly in the target system. An impact of the cause corresponding to the at least one anomaly is determined. A region of interest (ROI) in the target system corresponding to the anomaly is determined. One or more correlated region of interests (ROIs) in the target system corresponding to the at least one ROI is determined. One or more correlational anomalies are determined in the one or more correlated ROIs by prompting the LLM based on a fifth interrogative prompt.

20 Claims, 4 Drawing Sheets

300

Receiving a user experience corresponding to the target system, and specification data of the target system from a user 302

↓

Determining a first set of parameters based on the user experience and the specification data 304

↓

Determining a cause corresponding to at least one anomaly in the target system by prompting the LLM based on a first interrogative prompt 306

↓

Determining an impact of the cause corresponding to the at least one anomaly by prompting the LLM based on a second interrogative prompt 308

↓

Determining at least one region of interest (ROI) in the target system corresponding to the at least one anomaly by prompting the LLM based on a third interrogative prompt 310

↓

Determining one or more correlated ROIs in the target system corresponding to the at least one ROI by prompting the LLM based on a fourth interrogative prompt 312

↓

Determining one or more correlational anomalies in the one or more correlated ROIs by prompting the LLM based on a fifth interrogative prompt 314

↓

Outputting an anomaly report on a display detailing the at least one anomaly corresponding to the at least one ROI and the one or more correlational anomalies corresponding to the one or more correlated ROIs 316

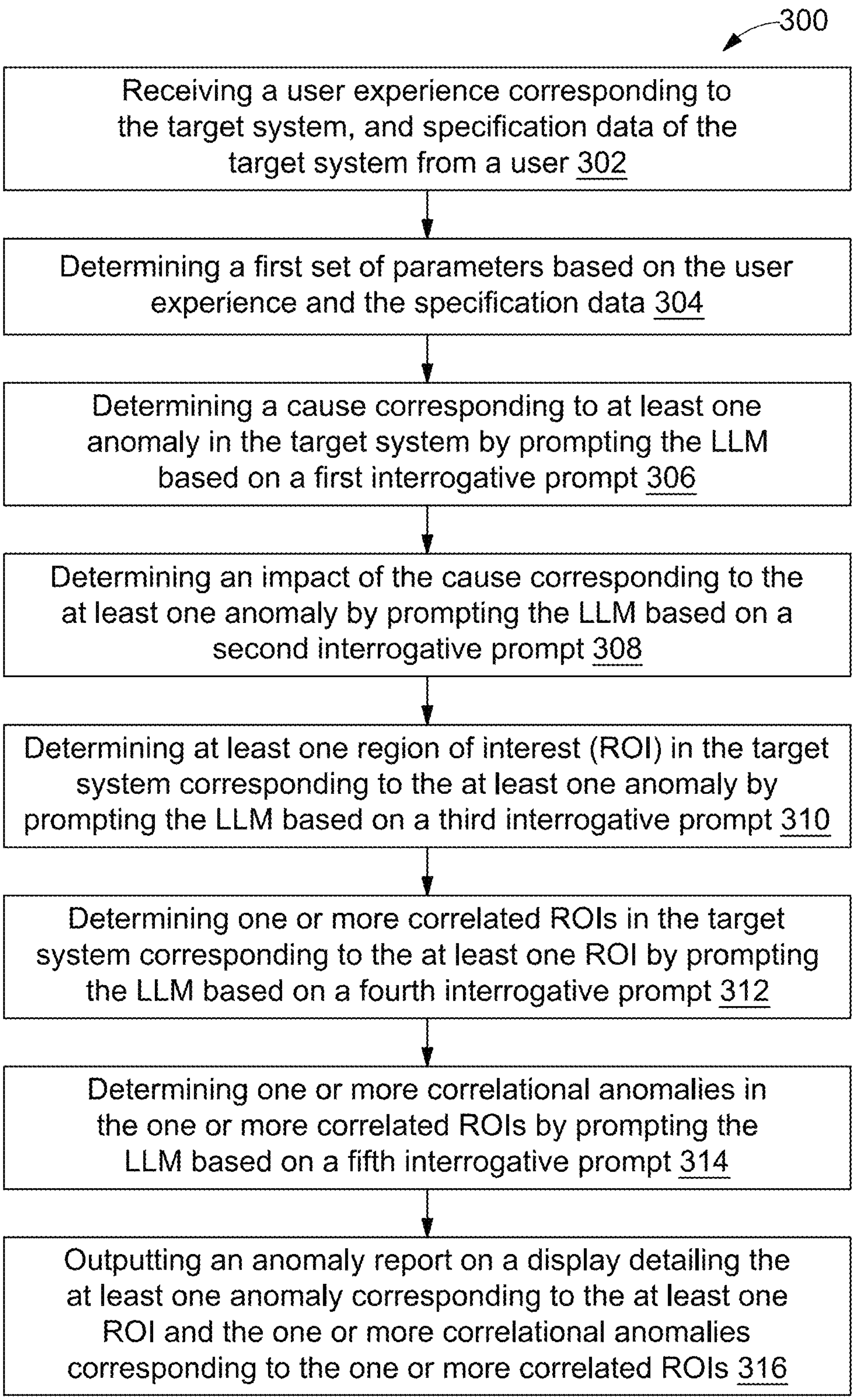

FIG. 3

METHOD AND SYSTEM OF DETERMINING ANOMALIES IN A TARGET SYSTEM USING A LARGE LANGUAGE MODEL

TECHNICAL FIELD

This disclosure relates generally to prompting large language models (LLMs) and more particularly to a method and system of determining anomalies in a target system using a large language model.

BACKGROUND

Anomaly detection is a critical aspect of data analysis, particularly in fields where identifying abnormal patterns can prevent significant issues, such as IT, cybersecurity, finance, healthcare, and automotive systems. Anomalies, often indicative of errors, fraud, or system failures, come in various forms and require sophisticated techniques for accurate detection and diagnosis. Most systems allow users to indicate issues faced by them by raising tickets or issues. Often the tickets raised by users include inaccurate and vague information about the issues faced by them. It is often the case that the issue indicated by the user is caused by completely unrelated cause which may remain undetected due to inaccurate and vague information. This may lead to frustrating both the customer and the service provider.

Further, the challenge in anomaly detection lies in accurately identifying different types of anomalies and understanding their implications within a system. Traditional methods often fall short in distinguishing between point anomalies, contextual anomalies, and collective anomalies which leads to incomplete or inaccurate analysis. The inability to effectively detect and classify these anomalies can result in significant operational inefficiencies, security vulnerabilities, and potential system failures.

Therefore, there is a requirement for an efficient and effective methodology for determining anomalies in a target system.

SUMMARY OF THE INVENTION

In an embodiment, a method for determining anomalies in a target system using a large language model (LLM), the method may include receiving, by a processor, a user experience corresponding to the target system, and specification data of the target system from a user. The method may further include determining, by the processor, a first set of parameters based on the user experience and the specification data. The method may further include determining, by the processor, a cause corresponding to at least one anomaly in the target system by prompting the LLM based on a first interrogative prompt. In an embodiment, the first interrogative prompt may be determined based on the first set of parameters. The method may further include determining, by the processor, an impact of the cause corresponding to the at least one anomaly by prompting the LLM based on a second interrogative prompt. In an embodiment, the LLM may be configured to determine the impact of the cause based on determination of a level of deviation of user-defined behaviour of the target system with respect to a predefined behaviour. The method may further include determining, by the processor, at least one ROI in the target system corresponding to the at least one anomaly by prompting the LLM based on a third interrogative prompt. The method may further include determining, by the processor, one or more correlated ROIs in the target system corresponding to the at least one ROI by prompting the LLM based on a fourth interrogative prompt. The method may further include determining, by the processor, one or more correlational anomalies in the one or more correlated ROIs by prompting the LLM based on a fifth interrogative prompt. In an embodiment, the fifth interrogative prompt may be determined based on a fifth set of parameters. In an embodiment, the fifth set of parameters may be determined based on a relational information of the one or more correlated ROIs and the at least one ROI, domain data of the target system and the specification information.

In another embodiment, a system for determining anomalies in a target system using a large language model (LLM) is disclosed. The system may include a processor, a memory communicably coupled to the processor, wherein the memory may store processor-executable instructions, which when executed by the processor may cause the processor to receive a user experience corresponding to the target system, and specification data of the target system from a user. The processor may further determine a cause corresponding to at least one anomaly in the target system by prompting the LLM based on a first interrogative prompt. In an embodiment, the first interrogative prompt may be determined based on the first set of parameters. The processor may further determine an impact of the cause corresponding to the at least one anomaly by prompting the LLM based on a second interrogative prompt. In an embodiment, the LLM may be configured to determine the impact of the cause based on determination of a level of deviation of user-defined behaviour of the target system with respect to a predefined behaviour. The processor may further determine at least one ROI in the target system corresponding to the at least one anomaly by prompting the LLM based on a third interrogative prompt. The processor may further determine one or more correlational anomalies in the one or more correlated ROIs by prompting the LLM based on a fifth interrogative prompt. In an embodiment, the fifth interrogative prompt may be determined based on a fifth set of parameters. In an embodiment, the fifth set of parameters may be determined based on a relational information of the one or more correlated ROIs and the at least one ROI, domain data of the target system and the specification information.

It is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this disclosure, illustrate exemplary embodiments and, together with the description, serve to explain the disclosed principles.

FIG. 3 illustrates a flow diagram of a method of determining anomalies in a target system using a large language model (LLM), in accordance with an embodiment of present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Conventional systems for anomaly detection typically focus on isolated approaches, each designed to detect a specific type of anomaly. For instance, point anomaly detection, contextual anomaly detection, collective anomaly detection. An example of a point anomaly is a single user trying to access a restricted server, which can indicate a potential security breach. An example of a contextual anomaly is an infotainment system in a car malfunctioning only when connected to a faulty battery represents a contextual anomaly. An example of a collective anomaly is a combination of seemingly unrelated issues, such as simultaneous problems with the brakes and the steering system in a car, could collectively indicate a systemic anomaly or a collective anomaly.

While conventional methods provide some level of anomaly detection, most of the conventional methods are designed to detect one type of anomaly at a time, failing to provide a holistic view of potential issues within a system. This compartmentalized approach can miss complex interdependencies between different anomaly types. Many conventional methods do not adapt well to varying contexts. Conventional methods often lack the ability to integrate and correlate data across different domains or devices. This limitation hinders the detection of collective anomalies or correlational anomalies, which require a broader perspective to understand the interactions and dependencies between multiple components.

Accordingly, the present disclosure provides a method and system for determining anomalies in a target system using a large language model (LLM).

Figure 1:
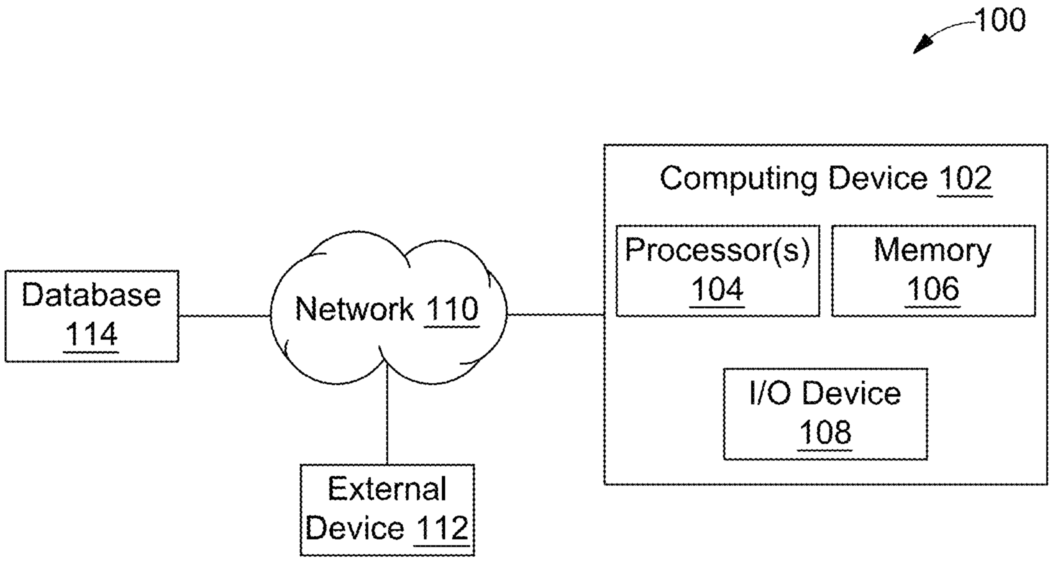
FIG. 1 illustrates a block diagram of an exemplary anomaly determination system for determining anomalies in a target system using a large language model (LLM), in accordance with an embodiment of the present disclosure.

Referring now to FIG. 1, a block diagram of an exemplary anomaly determination system 100 for determining anomalies in a target system using a large language model (LLM) is illustrated, in accordance with an embodiment of the present disclosure. The anomaly determination system 100 may include a computing device 102, an external device 112, and a database 114 communicably coupled to each other through a wired or wireless communication network 110. The computing device 102 may include a processor 104, a memory 106 and an input/output (I/O) device 108.

In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors.

In an embodiment, the memory 106 may store instructions that, when executed by the processor 104, and cause the processor 104 to determine anomalies in a target system using a large language model (LLM), as discussed in more detail below. In an embodiment, the memory 106 may be a non-volatile memory or a volatile memory. Examples of non-volatile memory may include, but are not limited to, a flash memory, a Read Only Memory (ROM), a Programmable ROM (PROM), Erasable PROM (EPROM), and Electrically EPROM (EEPROM) memory. Further, examples of volatile memory may include, but are not limited to, Dynamic Random Access Memory (DRAM), and Static Random-Access memory (SRAM).

In an embodiment, the I/O device 108 may comprise of variety of interface(s), for example, interfaces for data input and output devices, and the like. The I/O device 108 may facilitate inputting of instructions by a user communicating with the computing device 102. In an embodiment, the I/O device 108 may be wirelessly connected to the computing device 102 through wireless network interfaces such as Bluetooth®, infrared, or any other wireless radio communication known in the art. In an embodiment, the I/O device 108 may be connected to a communication pathway for one or more components of the computing device 102 to facilitate the transmission of inputted instructions and output results of data generated by various components such as, but not limited to, processor(s) 104.

In an embodiment, the database 114 may be enabled in a cloud or a physical database and may store historical data, domain data, and training data. In an embodiment, the training data may include data that may be used to train or fine-tune the large language models (LLMs). In an embodiment, the database 114 may store data input by an external device 112 or output generated by the computing device 102.

In an embodiment, the communication network 110 may be a wired or a wireless network or a combination thereof. The network 110 can be implemented as one of the different types of networks, such as but not limited to, ethernet IP network, intranet, local area network (LAN), wide area network (WAN), the internet, Wi-Fi, LTE network, CDMA network, 5G and the like. Further, the network 110 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 110 can include a variety of network devices, including routers, bridges, servers, computing devices, storage devices, and the like.

In an embodiment, the computing device 102 may receive a user input for determining anomalies in a target system using an LLM from an external device 112 through the network 110. In an embodiment, the computing device 102 and the external device 112 may be a computing system, including but not limited to, a smart phone, a laptop computer, a desktop computer, a notebook, a workstation, a portable computer, a handheld, a scanner, or a mobile device. In an embodiment, the computing device 102 may be, but not limited to, in-built into the external device 112 or may be a standalone computing device.

In an embodiment, the computing device 102 may perform various processing in order to determine anomalies in a target system using an LLM. By way of an example, the target system may include an IT system, an IOT device, a vehicle, etc. Further, the computing device 102 may receive a user experience corresponding to the target system via the I/O device 108, and specification data of the target system from a user. In an embodiment, the user experience may be, but is not limited to, in a form of a voice note, an audio-visual message, or a text message, an email message received via the I/O device 108. In an embodiment, the specification data may include a type of target system, a model corresponding to the target system, and technical features of the target system.

Further, the computing device 102 may determine a first set of parameters based on the user experience and the specification data. In an embodiment, the first set of parameters may include occurrence, symptoms observed, and a process followed during the occurrence of the symptoms.

Further, the computing device 102 may determine a cause corresponding to at least one anomaly in the target system by prompting the LLM based on a first interrogative prompt. In an embodiment, examples of the LLM may include, but are not limited to, zephyr, code LLAMA, GPT, etc. In an embodiment, the first interrogative prompt may be determined based on the first set of parameters.

The computing device 102 may further determine an impact of the cause corresponding to the at least one anomaly by prompting the LLM based on a second interrogative prompt. In an embodiment, the LLM may be configured to determine the impact of the cause based on determination of a level of deviation of user-defined behaviour of the target system with respect to a predefined behaviour. In an embodiment, the user-defined behaviour may be determined based on the user experience. In an embodiment, the predefined behaviour may be determined based on the domain data. In an embodiment, the second interrogative prompt may be determined based on a second set of parameters. In an embodiment, the second set of parameters may be determined based on the first set of parameters, the specification data, the cause and the domain data of the target system.

Further, the computing device 102 may determine at least one region of interest (ROI) in the target system corresponding to the at least one anomaly by prompting the LLM based on a third interrogative prompt. In an embodiment, the third interrogative prompt may be determined based on a third set of parameters. In an embodiment, the third set of parameters may be determined based on the specification data, the domain data, the cause, the impact, secondary data and historical anomaly data of the target system. In an embodiment, the secondary data may include secondary specification data of a sub-system of the target system. In an embodiment the secondary specification data of the sub-system may include technical specification of target system from documents listing all sub-systems, components and subcomponents present in the target system, dos and don'ts related to the target system, and technical characteristics and technical relationship of all the sub-systems, components and subcomponents of the target system. Further, domain data may include specification data such as user manual, etc. of target systems of make and type other than the make and type of the target system in review but performing same functions or being of same domain. In an embodiment, the historical anomaly data may include one or more historical anomalies determined in the target system or its sub-components.

Further, the computing device 102 may determine one or more correlated region of interests (ROIs) in the target system corresponding to the at least one ROI by prompting the LLM based on a fourth interrogative prompt. In an embodiment, the fourth interrogative prompt may be determined based on a fourth set of parameters. In an embodiment, the fourth set of parameters may be determined based on the relational information between the one or more correlated ROIs and the at least one ROI. In an embodiment, the relational information may be determined based on the domain data of the target system, the cause, the impact, the at least one ROI, and the specification information.

Further, the computing device 102 may determine one or more correlational anomalies in the one or more correlated ROIs by prompting the LLM based on a fifth interrogative prompt. In an embodiment, the fifth interrogative prompt may be determined based on a fifth set of parameters. In an embodiment, the fifth set of parameters may be determined based on a relational information of the one or more correlated ROIs and the at least one ROI, domain data of the target system and the specification information.

Thereafter, the computing device 102 may determine the at least one anomaly corresponding to the at least one ROI and the one or more correlational anomalies corresponding to the one or more correlated ROIs based on a methodology described in previously filed patent application Ser. No. "17/535,698" and titled "SYSTEM AND A METHOD FOR DETECTING POINT ANOMALY" incorporated herein in its entirety by reference.

Further, the computing device 102 may further output an anomaly report on a display device of the I/O device 108 detailing the at least one anomaly corresponding to the at least one ROI and the one or more correlational anomalies corresponding to the one or more correlated ROIs.

Figure 2:
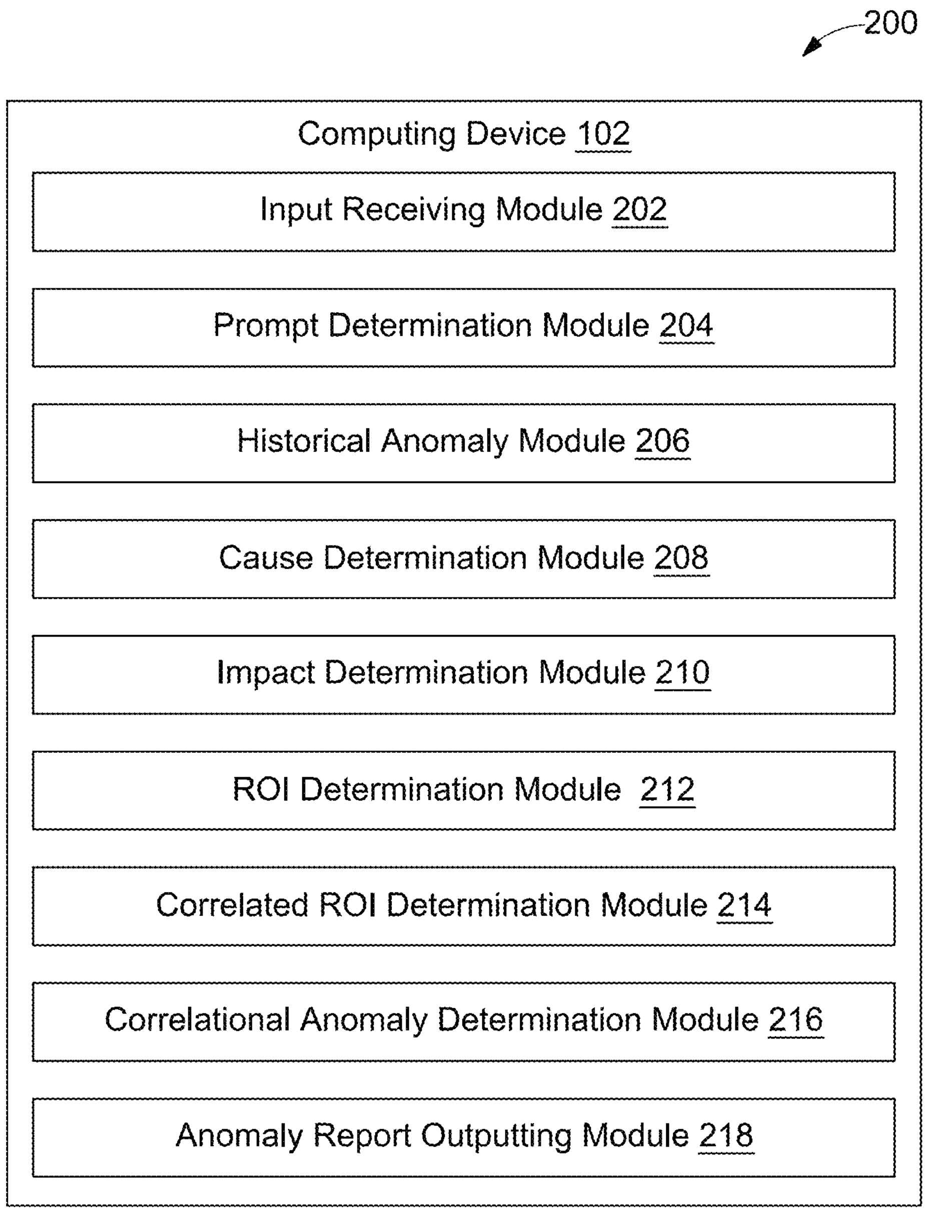
FIG. 2 illustrates a functional block diagram of a computing device, in accordance with an embodiment of the present disclosure.

Referring now to FIG. 2, a functional block diagram of the computing device 102 is illustrated, in accordance with an embodiment of the present disclosure. In an embodiment, the computing device 102 may include an input receiving module 202, a prompt determination module 204, a historical anomaly module 206, a cause determination module 208, an impact determination module 210, an ROI determination module 212, a correlated ROI determination module 214, a correlational anomaly determination module 216, and an anomaly report outputting module 218.

The input receiving module 202 may receive a user experience corresponding to the target system, and specification data of the target system from a user. In an embodiment, the user experience may be, but is not limited to, in a form of a voice note, audio-visual message, or a text message, an email message received via the I/O device 108. In an embodiment, the user experience may define one or more problems or issues faced by the user while operating the target system. In an embodiment, the specification data may include a type of target system, a model corresponding to the target system, and technical features of the target system.

In a first exemplary embodiment, the user experience corresponding to a vehicle system may be received as follows "My car is allergic to vanilla ice cream as it stops whenever I go to eat vanilla ice cream." In a second exemplary embodiment, the user experience corresponding to a water system may be received as follows "The water system having water leaking issue from its carbonate, leading to a service request. The engineer identified a faulty bladder or diaphragm, inside water tank and also recommended replacing aging candles to maintain water quality and system integrity." In a third exemplary embodiment, the user experience corresponding to an infotainment system may be received as follows "The car's infotainment system malfunctioned due to a burnt capacitor from prolonged use. Other components like battery and connections were inspected, revealing an aging battery. The service center also noted a log of an axel issue." It is to be noted that use statement may be received from service technicians or users using the target system. Further, the user input receiving module 202 may receive specification data of the target system from the user such as make and model of the target system, year of manufacture, etc.

The input receiving module 202 may further determine a first set of parameters based on the user experience and the specification data. In an embodiment, the first set of parameters may include occurrence, symptoms observed, and a process followed during occurrence of the symptoms. In an embodiment, occurrence may include a time and place when the issues or the problems were faced. Further, symptoms observed may include one or more system reactions in response to the issues or the problems. In accordance with the first, second and third exemplary embodiments, example of the symptoms observed may include car not starting, water leaking and infotainment malfunctioning, etc. respectively. Further, the process followed during occurrence of the symptoms may include what were the steps taken to operate the target system when the symptoms occurred. In accordance with the first, second and third exemplary embodiments, example of the process followed may include, starting ignition of the vehicle, dispensing of water from the water purifier, switching on the infotainment system, etc.

Accordingly, for the first, the second and the third exemplary embodiments, the first set of parameters may be determined based on the occurrence, the symptoms observed, and the process followed during occurrence of the symptoms and based on the user experience.

Further, the prompt determination module 204 may determine a first interrogative prompt based on the first set of parameters. In the first exemplary embodiment, the prompt determination module 204 may determine the first interrogative prompt as, but is not limited to, "why was the #symptoms observed in that #occurrence?" In an embodiment, the "#symptoms" and "#occurrence" may be determined as symptoms and occurrence based on user experience.

The cause determination module 208 may determine a cause corresponding to at least one anomaly in the target system by prompting an LLM based on the first interrogative prompt. In an embodiment, examples of the LLM may include, but are not limited to, zephyr, code LLAMA, GPT, etc.

The prompt determination module 204 may determine a second interrogative prompt based on a second set of parameters. In an embodiment, the second set of parameters may be determined based on the first set of parameters, the specification data, the cause determined by the cause determination module 208 and the domain data of the target system. In an embodiment, the domain data may include specification data such as user manual, etc. of systems of make and type other than the make and type of the target system in review but performing same functions or being of same domain.

In the first exemplary embodiment, the second exemplary embodiment, and the third exemplary embodiment, the prompt determination module 204 may determine the second interrogative prompt as, but is not limited to, "why did the anomaly deviate from the expected behaviour?"

The impact determination module 210 may determine an impact of the cause corresponding to the at least one anomaly by prompting the LLM based on the second interrogative prompt. In an embodiment, the LLM may be configured to determine the impact of the cause based on determination of a level of deviation of user-defined behaviour of the target system with respect to a predefined behaviour. In an embodiment, the user-defined behaviour may be determined based on the user experience. In an embodiment, the predefined behaviour may be determined based on the domain data and/or the specification data.

The prompt determination module 204 may determine a third interrogative prompt that may be determined based on a third set of parameters. In an embodiment, the third set of parameters may be determined based on the specification data, the domain data, the cause, the impact, secondary data, and historical anomaly data of the target system. In an embodiment, the specification data may not always be available and need to be sourced from the secondary data related to the target system. In an embodiment, the secondary data may include secondary specification data of a sub-system of the target system. In an embodiment the secondary specification data of the target system may include data from documents like list of all components and subcomponents present in the target system, dos and don'ts related to the target system, characteristics of all the components and subcomponents of the target system. In accordance with the first, the second and the third exemplary embodiment, the prompt determination module 204 may determine the third interrogative prompt as, but is not limited to, "why the anomaly occurred?"

In an embodiment, the historical anomaly data may include one or more historical anomalies determined in the target system. The historical anomaly data of the target system may be determined by the historical anomaly module 206 which stores the one or more historical anomalies determined in the target system.

The ROI determination module 212 may determine at least one region of interest (ROI) in the target system corresponding to the at least one anomaly by prompting the LLM based on the third interrogative prompt. In accordance with the first exemplary embodiment, the ROI determination module 212 may determine the at least one ROI in the vehicle system, such as the engine, based on time data. By correlating engine components with the time-data, the ROI determination module 212 identified the anomaly as "vapor lock". In accordance with the second exemplary embodiment, the ROI determination module 212 may determine the at least one ROI in the water system as the bladder or diaphragm inside water tank as it was faulty. In accordance with the third exemplary embodiment, the ROI determination module 212 may determine the at least one ROI as a capacitor of the infotainment system as excess heat due to prolonged use of the infotainment that led to capacitor burnout.

The prompt determination module 204 may determine a fourth interrogative prompt based on a fourth set of parameters. In an embodiment, the fourth set of parameters may be determined based on the relational information between the one or more correlated ROIs and the at least one ROI. In an embodiment, the relational information may be determined based on the domain data of the target system, the cause, the impact, the at least one ROI, and the specification information.

In accordance with the first, the second and the third exemplary embodiment, the prompt determination module 204 may determine a fourth interrogative prompt to determine "why point anomaly detection failed to detect anomaly?"

The correlational anomaly determination module 214 may determine one or more correlated region of interests (ROIs) in the target system corresponding to the at least one ROI by prompting the LLM based on the fourth interrogative prompt. In accordance with the first exemplary embodiment, the correlational anomaly determination module 214 may determine one or more correlated ROIs in the vehicle system as the chamber in the engine which are dependent on vapor locks. In accordance with the second exemplary embodiment, the correlational anomaly determination module 214 may determine one or more correlated ROIs in the water system as shutoff valve may cause leakage of water if the bladder or diaphragm inside water tank is found faulty. In accordance with the third exemplary embodiment, the correlational anomaly determination module 214 may determine one or more correlated ROIs as battery and wire connections in the infotainment system as they are dependent components of the infotainment system.

The prompt determination module 204 may determine a fifth interrogative prompt based on a fifth set of parameters. In an embodiment, the fifth set of parameters may be determined based on a relational information of the one or more correlated ROIs and the at least one ROI, the domain data of the target system, and the specification information.

The prompt determination module 204 may determine the fifth interrogative prompt in order to determine "why did the existing anomaly detection algorithm or model fail to identify the anomaly?"

The correlational anomaly determination module 216 may determine one or more correlational anomalies in the one or more correlated ROIs by prompting the LLM based on the fifth interrogative prompt. The determination of the one or more correlational anomalies may involve detecting clusters of ROIs as one or more correlated ROIs based on technical and functional dependencies and correlational relationships. Further, correlational anomalies in the one or more correlated ROIs may be determined by segregating anomalies within each cluster of ROIs. Further, in an embodiment, collective anomaly detection may include anomaly determined in different ROIs simultaneously that may cause creation of multiple clusters. This means that when examining various components and sub-components of the target system, dependencies among these components may lead to the creation of distinct groups or clusters, each representing a potential ROI of anomalies. In accordance with the first exemplary embodiment, the correlational anomaly determination module 216 may determine the one or more correlation anomalies related to vapor lock. Accordingly, clusters may be formed based on the ROIs or components of the vehicle that may showcase functional issues due to the vapor lock. Each ROI in the cluster may be then analyzed for point anomalies, which may help in identifying issues specific to individual components within the cluster. According to the second exemplary embodiment, the correlational anomaly determination module 216 may determine the one or more correlation anomalies resulting in multiple distinct clusters. For example, one cluster may be associated with leaks, and the other with aging filters. This segregation of the clusters may help in pinpointing the root cause of the one or more correlational anomalies by categorizing them based on their underlying causes. In the third exemplary embodiment, the correlational anomaly determination module 216 may determine one or more correlation anomalies based on determination of an anomalies in the axle and the battery of the car. Accordingly, two clusters may be formed, one related to the axle and one related to the battery. Accordingly, the correlational anomaly determination module 216 may determine one or more correlational anomalies for each of the two clusters.

Thereafter, the computing device 102 may determine the at least one anomaly corresponding to the at least one ROI and the one or more correlational anomalies corresponding to the one or more correlated ROIs based on a methodology described in previously filed patent application Ser. No. "17/535,698" and titled "SYSTEM AND A METHOD FOR DETECTING POINT ANOMALY" incorporated herein in its entirety by reference. Furthermore, the historical anomaly module 206 may store the at least one anomaly and the correlational anomalies determined in the target system.

Further, in accordance with the first, the second and the third exemplary embodiments, the computing device 102 may perform point anomaly to find the issue with each correlated ROIs. For example, according to the third exemplary embodiment, point anomaly in each of the relational ROIs may be determined such as "battery is not getting charge" or "issue in circuit", and "alignment issue" in the axel.

Accordingly, the anomaly report outputting module 218 may output an anomaly report on a display detailing the at least one anomaly corresponding to the at least one ROI and the one or more correlational anomalies corresponding to the one or more correlated ROIs.

It should be noted that all such aforementioned modules 202-218 may be represented as a single module or a combination of different modules. Further, as will be appreciated by those skilled in the art, each of the modules 202-218 may reside, in whole or in parts, on one device or multiple devices in communication with each other. In some embodiments, each of the modules 202-218 may be implemented as dedicated hardware circuit comprising custom application-specific integrated circuit (ASIC) or gate arrays, off-the-shelf semiconductors such as logic chips, transistors, or other discrete components. Each of the modules 202-218 may also be implemented in a programmable hardware device such as a field programmable gate array (FGPA), programmable array logic, programmable logic device, and so forth. Alternatively, each of the modules 202-218 may be implemented in software for execution by various types of processors (e.g. processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for determining anomalies in a target system using a large language model (LLM). For example, the exemplary system 100 and the associated computing device 102 may determine anomalies in the target system by the processes discussed herein. In particular, as will be appreciated by those of ordinary skill in the art, control logic and/or automated routines for performing the techniques and steps described herein may be implemented by the system 100 and the associated computing device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Referring now to FIG. 3, a flow diagram of a method 300 of determining anomalies in a target system using a large language model (LLM) is illustrated, in accordance with an embodiment of present disclosure. In an embodiment, the method 300 may include a plurality of steps that may be performed by the processor 104 to determine anomalies in a target system.

FIG. 3 is explained in conjunction with FIGS. 1 and 2. Each step of the method 300 may be executed by various modules of the computing device 102.

At step 302, a user experience corresponding to a target system, and specification data of the target system may be received from a user for querying an LLM to determine anomalies in the target system. In an embodiment, the user experience may be, but is not limited to, in a form of statement or a prompt. In an embodiment, the specification data may include a type of target system, a model corresponding to the target system, and features related to the target system.

Further, at step 304, a first set of parameters may be determined based on the user experience and the specification data. In an embodiment, the first set of parameters may include occurrence, symptoms observed, and a process followed during occurrence of the symptoms.

Further, at step 306, a cause corresponding to at least one anomaly in the target system may be determined by prompting the LLM based on a first interrogative prompt. In an embodiment, the first interrogative prompt may be determined based on the first set of parameters.

Further, at step 308, an impact of the cause corresponding to the at least one anomaly may be determined by prompting the LLM based on a second interrogative prompt. In an embodiment, the LLM may be configured to determine the impact of the cause based on determination of a level of deviation of user-defined behaviour of the target system with respect to a predefined behaviour. In an embodiment, the user-defined behaviour may be determined based on the user experience. In an embodiment, the predefined behaviour may be determined based on the domain data. In an embodiment, the second interrogative prompt may be determined based on the domain data. In an embodiment, the second interrogative prompt may be determined based on a second set of parameters. In an embodiment, the second set of parameters may be determined based on the first set of parameters, the specification data, the cause and the domain data of the target system.

Further at step 310, at least one region of interest (ROI) may be determined in the target system corresponding to the at least one anomaly by prompting the LLM based on a third interrogative prompt. In an embodiment, the third interrogative prompt may be determined based on a third set of parameters. In an embodiment, the third set of parameters may be determined based on the specification data, the domain data, the cause, the impact, secondary data and historical anomaly data of the target system. In an embodiment, the secondary data may include secondary specification data of a sub-system of the target system. In an embodiment the secondary specification data of the target system may include data from documents like list of all components and subcomponents present in the target system, dos and don'ts related to the target system, characteristics of all the components and subcomponents of the target system. In an embodiment, the historical anomaly data may include one or more historical anomalies determined in the target system.

Further at step 312, one or more correlated region of interests (ROIs) may be determined in the target system corresponding to the at least one ROI by prompting the LLM based on a fourth interrogative prompt. In an embodiment, the fourth interrogative prompt may be determined based on a fourth set of parameters. In an embodiment, the fourth set of parameters may be determined based on the relational information between the one or more correlated ROIs and the at least one ROI. In an embodiment, the relational information may be determined based on the domain data of the target system, the cause, the impact, the at least one ROI, and the specification information.

Further at step 314, one or more correlational anomalies may be determined in the one or more correlated ROIs by prompting the LLM based on a fifth interrogative prompt. In an embodiment, the fifth interrogative prompt may be determined based on a fifth set of parameters. In an embodiment, the fifth set of parameters may be determined based on a relational information of the one or more correlated ROIs and the at least one ROI, domain data of the target system and the specification information. Thereafter, the computing device 102 may determine the at least one anomaly corresponding to the at least one ROI from the one or more correlational anomalies corresponding to the one or more correlated ROIs.

Further at step 316, an anomaly report may be outputted on a display detailing the at least one anomaly corresponding to the at least one ROI and the one or more correlational anomalies corresponding to the one or more correlated ROIs.

Figure 4:
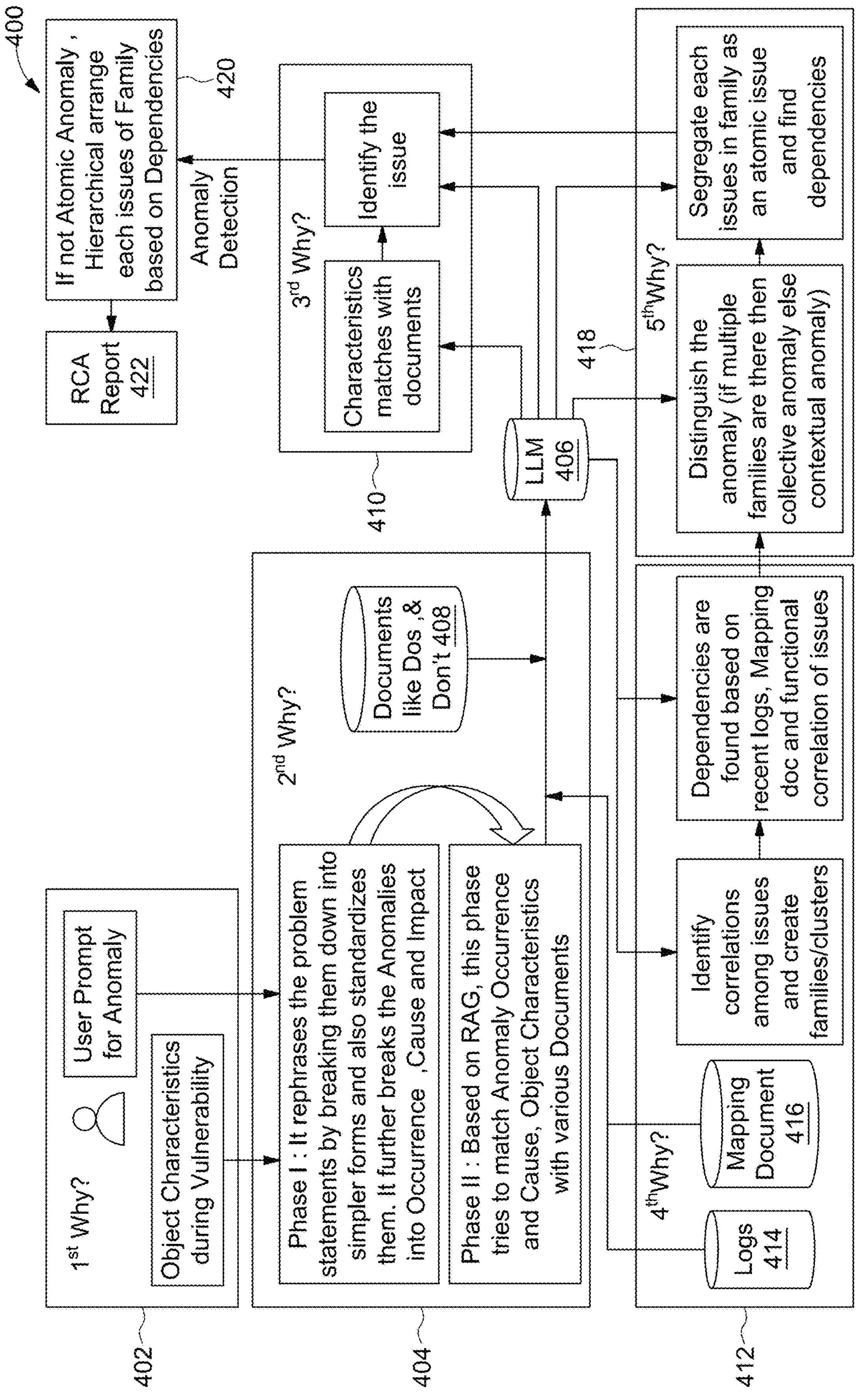
FIG. 4 illustrates an architecture diagram for determining anomalies in a target system using a large language model (LLM), in accordance with an embodiment of present disclosure.

Referring now to FIG. 4, an architecture diagram 400 for determining anomalies in a target system using a large language model is illustrated, in accordance with an embodiment of present disclosure.

FIG. 4 is explained in conjunction with FIGS. 1, 2 and 3. As described earlier, block 402 may include block 402*a* in which a user experience corresponding to a target system may be received as input from a user via the I/O device 108. Further, at block 402 specification data including object characteristics of the target system may be received from the user. Further, the input received at block 402 may be used to determine the first set of parameters. The user experience received in block 402 may be broken down into simpler statements and standardized based on pre-defined rules to determine the first prompt. Further, at block 404 based on querying an LLM 406 based on the first prompt a cause corresponding to at least one anomaly in the target system may be determined.

In an embodiment, the user experience may be, but is not limited to, in a form of a voice note, audio-visual message, a text message, or an email message, etc. In an embodiment, the specification data may include a type of target system, a model corresponding to the target system, and technical features related to the target system. In an embodiment, based on the specification data of the target system may use Retrieval augmented generation (RAG) to determine data from documents like list of all components and subcomponents present in the target system, dos and don'ts related to the target system, characteristics of all the components and subcomponents of the target system at block 404.

Further, at step 404, In an embodiment, the first set of parameters may include occurrence, symptoms observed, and a process followed during occurrence of the symptoms. In an embodiment, the process followed during the occurrence of the symptoms may be received by the LLM 406 through a document database 408. The document database 408 may include documents like Dos and Don't corresponding to the target system determined as a result of block 404.

Further, at step 410, a cause corresponding to at least one anomaly in the target system may be determined by prompting the LLM 406 based on a first interrogative prompt. In an embodiment, the first interrogative prompt may be determined based on the first set of parameters.

Further, at step 412, an impact of the cause corresponding to the at least one anomaly may be determined by prompting the LLM 406 based on a second interrogative prompt. In an embodiment, the LLM 406 may be configured to determine the impact of the cause based on determination of a level of deviation of user-defined behaviour of the target system with respect to a predefined behaviour. In an embodiment, the user-defined behaviour may be determined based on the user experience. In an embodiment, the predefined behaviour may be determined based on the domain data. In an embodiment, the domain data may be stored in a logs database 414, and a mapping document database 416. In an embodiment, the second interrogative prompt may be determined based on a second set of parameters. In an embodiment, the second set of parameters may be determined based on the first set of parameters, the specification data, the cause and the domain data of the target system. Furthermore, at block 410, at least one region of interest (ROI) may be determined in the target system corresponding to the at least one anomaly by prompting the LLM 406 based on a third interrogative prompt. In an embodiment, the third interrogative prompt may be determined based on a third set of parameters. In an embodiment, the third set of parameters may be determined based on the specification data, the domain data, the cause, the impact, secondary data and historical anomaly data of the target system. In an embodiment, the secondary data may include secondary specification data of a sub-system of the target system. In an embodiment, the historical anomaly data may include one or more historical anomalies determined in the target system.

Further at step 418, one or more correlated region of interests (ROIs) may be determined in the target system corresponding to the at least one ROI by prompting the LLM 406 based on a fourth interrogative prompt. In an embodiment, the fourth interrogative prompt may be determined based on a fourth set of parameters. In an embodiment, the fourth set of parameters may be determined based on the relational information between the one or more correlated ROIs and the at least one ROI. In an embodiment, the relational information may be determined based on the domain data of the target system, the cause, the impact, the at least one ROI, and the specification information. Thereafter, at block 418 one or more correlational anomalies may be determined in the one or more correlated ROIs by prompting the LLM 406 based on a fifth interrogative prompt. In an embodiment, the fifth interrogative prompt may be determined based on a fifth set of parameters. In an embodiment, the fifth set of parameters may be determined based on a relational information of the one or more correlated ROIs and the at least one ROI, domain data of the target system and the specification information.

Further, the at least one anomaly corresponding to the at least one ROI from the one or more correlational anomalies corresponding to the one or more correlated ROIs may be determined based on a methodology described in previously filed patent application Ser. No. "17/535,698" and titled "SYSTEM AND A METHOD FOR DETECTING POINT ANOMALY" incorporated herein in its entirety by reference.

Further at step 420, if the at least one anomaly may not be determined, hierarchically arrange each of the one or more correlational anomalies corresponding to the one or more correlated ROIs.

Further, at step 422, an anomaly report may be outputted on a display detailing the at least one anomaly corresponding to the at least one ROI and the one or more correlational anomalies corresponding to the one or more correlated ROIs.

Thus, the disclosed method and system tries to overcome the technical problem of determining anomalies in a target system through a method and system of determining anomalies in a target system using a large language model. In an embodiment, advantages of the disclosed method and system may include but are not limited to comprehensive analysis of anomalies, including point anomalies, contextual anomalies, and collective anomalies.

As will be appreciated by those skilled in the art, the techniques described in the various embodiments discussed above are not routine, or conventional, or well-understood in the art. The techniques discussed above provide for determining anomalies in a target system using a large language model.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps bring an improvement in the functioning of the device itself as the claimed steps provide a technical solution to a technical problem.

The specification has described method and system for determining anomalies in a target system using a large language model. The illustrated steps are set out to explain the exemplary embodiments shown, and it should be anticipated that ongoing technological development will change the manner in which particular functions are performed. These examples are presented herein for purpose of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope of disclosed embodiments being indicated by the following claims.

What is claimed is:

1. A method of determining anomalies in a target system using a large language model (LLM), the method comprising:

receiving, by a processor, a user experience corresponding to the target system, and specification data of the target system from a user;

determining, by the processor, a first set of parameters based on the user experience and the specification data;

determining, by the processor, a cause corresponding to at least one anomaly in the target system by prompting the LLM based on a first interrogative prompt, wherein the first interrogative prompt is determined based on the first set of parameters;

determining, by the processor, an impact of the cause corresponding to the at least one anomaly by prompting the LLM based on a second interrogative prompt, wherein the LLM is configured to determine the impact of the cause based on determination of a level of deviation of a user-defined behaviour of the target system with respect to a predefined behaviour;

determining, by the processor, at least one region of interest (ROI) in the target system corresponding to the at least one anomaly by prompting the LLM based on a third interrogative prompt;

determining, by the processor, one or more correlated region of interests (ROIs) in the target system corresponding to the at least one ROI by prompting the LLM based on a fourth interrogative prompt; and determining, by the processor, one or more correlational anomalies in the one or more correlated ROIs by prompting the LLM based on a fifth interrogative prompt, wherein the fifth interrogative prompt is determined based on a fifth set of parameters, and wherein the fifth set of parameters are determined based on a relational information of the one or more correlated ROIs and the at least one ROI, domain data of the target system and the specification information.

2. The method of claim 1, wherein the first set of parameters comprises occurrence, symptoms observed, and a process followed during occurrence of the symptoms.

3. The method of claim 2, wherein the second interrogative prompt is determined based on a second set of parameters, and wherein the second set of parameters are determined based on the first set of parameters, the specification data, the cause, and the domain data of the target system.

4. The method of claim 3, wherein the third interrogative prompt is determined based on a third set of parameters, wherein the third set of parameters are determined based on the specification data, the domain data, the cause, the impact, secondary data, and historical anomaly data of the target system, wherein the secondary data comprises secondary specification data of a sub-system of the target system, and wherein the historical anomaly data comprises one or more historical anomalies determined in the target system.

5. The method of claim 4, wherein the fourth interrogative prompt is determined based on a fourth set of parameters, wherein the fourth set of parameters are determined based on the relational information between the one or more correlated ROIs and the at least one ROI, and wherein the relational information is determined based on the domain data of the target system, the cause, the impact, the at least one ROI, and the specification information.

6. The method of claim 1, wherein the user-defined behaviour is determined based on the user experience, and wherein the predefined behaviour is determined based on the domain data.

7. The method of claim 1, comprises:

outputting, by the processor, an anomaly report on a display detailing the at least one anomaly corresponding to the at least one ROI and the one or more correlational anomalies corresponding to the one or more correlated ROIs.

8. A system for determining anomalies in a target system using a large language model (LLM), the system comprising:

a processor;

a memory communicably coupled to the processor, wherein the memory stores processor-executable instructions, which, on execution, cause the processor to:

receive a user experience corresponding to the target system and specification data of the target system from a user;

determine a cause corresponding to at least one anomaly in the target system by prompting the LLM based on a first interrogative prompt, wherein the first interrogative prompt is determined based on the first set of parameters;

determine an impact of the cause corresponding to the at least one anomaly by prompting the LLM based on a second interrogative prompt, wherein the LLM is configured to determine the impact of the cause based on determination of a level of deviation of a user-defined behaviour of the target system with respect to a predefined behaviour;

determine at least one region of interest (ROI) in the target system corresponding to the at least one anomaly by prompting the LLM based on a third interrogative prompt;

determine one or more correlated ROIs in the target system corresponding to the at least one ROI by prompting the LLM based on a fourth interrogative prompt; and determine one or more correlational anomalies in the one or more correlated ROIs by prompting the LLM based on a fifth interrogative prompt, wherein the fifth interrogative prompt is determined based on a fifth set of parameters, and wherein the fifth set of parameters are determined based on a relational information of the one or more correlated ROIs and the at least one ROI, domain data of the target system and the specification information.

9. The system of claim 8, wherein the first set of parameters comprises occurrence, symptoms observed, and a process followed during occurrence of the symptoms.

10. The system of claim 9, wherein the second interrogative prompt is determined based on a second set of parameters, and wherein the second set of parameters are determined based on the first set of parameters, the specification data, the cause, and the domain data of the target system.

11. The system of claim 10, wherein the third interrogative prompt is determined based on a third set of parameters, wherein the third set of parameters are determined based on the specification data, the domain data, the cause, the impact, secondary data, and historical anomaly data of the target system, wherein the secondary data comprises secondary specification data of a sub-system of the target system, and wherein the historical anomaly data comprises one or more historical anomalies determined in the target system.

12. The system of claim 11, wherein the fourth interrogative prompt is determined based on a fourth set of parameters, wherein the fourth set of parameters are determined based on the relational information between the one or more correlated ROIs and the at least one ROI, and wherein the relational information is determined based on the domain data of the target system, the cause, the impact, the at least one ROI, and the specification information.

13. The system of claim 8, wherein the processor-executable instructions, which, on execution, cause the processor to:

output an anomaly report on a display detailing the at least one anomaly corresponding to the at least one ROI and the one or more correlational anomalies corresponding to the one or more correlated ROIs.

14. A non-transitory computer-readable medium storing computer-executable instructions for determining anomalies in a target system using a large language model (LLM), the computer-executable instructions configured for:

receiving a user experience corresponding to the target system, and specification data of the target system from a user;

determining a first set of parameters based on the user experience and the specification data;

determining a cause corresponding to at least one anomaly in the target system by prompting the LLM based on a first interrogative prompt, wherein the first interrogative prompt is determined based on the first set of parameters;

determining an impact of the cause corresponding to the at least one anomaly by prompting the LLM based on a second interrogative prompt, wherein the LLM is configured to determine the impact of the cause based on determination of a level of deviation of a user-defined behaviour of the target system with respect to a predefined behaviour;

determining at least one region of interest (ROI) in the target system corresponding to the at least one anomaly by prompting the LLM based on a third interrogative prompt;

determining one or more correlated region of interests (ROIs) in the target system corresponding to the at least one ROI by prompting the LLM based on a fourth interrogative prompt; and determining one or more correlational anomalies in the one or more correlated ROIs by prompting the LLM based on a fifth interrogative prompt, wherein the fifth interrogative prompt is determined based on a fifth set of parameters, and wherein the fifth set of parameters are determined based on a relational information of the one or more correlated ROIs and the at least one ROI, domain data of the target system and the specification information.

15. The non-transitory computer-readable medium of claim 14, wherein the first set of parameters comprises occurrence, symptoms observed, and a process followed during occurrence of the symptoms.

16. The non-transitory computer-readable medium of claim 15, wherein the second interrogative prompt is determined based on a second set of parameters, and wherein the second set of parameters are determined based on the first set of parameters, the specification data, the cause, and the domain data of the target system.

17. The non-transitory computer-readable medium of claim 16, wherein the third interrogative prompt is determined based on a third set of parameters, wherein the third set of parameters are determined based on the specification data, the domain data, the cause, the impact, secondary data, and historical anomaly data of the target system, wherein the secondary data comprises secondary specification data of a sub-system of the target system, and wherein the historical anomaly data comprises one or more historical anomalies determined in the target system.

18. The non-transitory computer-readable medium of claim 17, wherein the fourth interrogative prompt is determined based on a fourth set of parameters, wherein the fourth set of parameters are determined based on the relational information between the one or more correlated ROIs and the at least one ROI, and wherein the relational information is determined based on the domain data of the target system, the cause, the impact, the at least one ROI, and the specification information.

19. The non-transitory computer-readable medium of claim 14, wherein the user-defined behaviour is determined based on the user experience, and wherein the predefined behaviour is determined based on the domain data.

20. The non-transitory computer-readable medium of claim 14, wherein the computer-executable instructions are further configured for:

outputting an anomaly report on a display detailing the at least one anomaly corresponding to the at least one ROI and the one or more correlational anomalies corresponding to the one or more correlated ROIs.

* * * * *